(12) United States Patent
Matsuoka

(10) Patent No.: US 7,737,882 B2
(45) Date of Patent: Jun. 15, 2010

(54) RADAR DEVICE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 176 days.

(21) Appl. No.: 11/313,668

(22) Filed: Dec. 22, 2005

(65) Prior Publication Data

US 2007/0040727 A1 Feb. 22, 2007

(30) Foreign Application Priority Data

Aug. 16, 2005 (JP) ............................. 2005-235702

(51) Int. Cl.
*G01S 13/42* (2006.01)
(52) U.S. Cl. .......................... 342/109; 342/70; 342/94; 342/110
(58) Field of Classification Search ................... 342/70, 342/107, 112, 118, 128, 129, 130, 109
See application file for complete search history.

(56) References Cited

U.S. PATENT DOCUMENTS

| | | | | | |
|---|---|---|---|---|---|
| 5,485,159 | A | * | 1/1996 | Zhang et al. | 342/165 |
| 5,517,197 | A | * | 5/1996 | Algeo et al. | 342/70 |
| 5,568,083 | A | * | 10/1996 | Uchiyama et al. | 327/538 |
| 6,018,309 | A | * | 1/2000 | Mitsumoto et al. | 342/109 |
| 6,124,823 | A | * | 9/2000 | Tokoro | 342/70 |
| 6,348,889 | B1 | * | 2/2002 | Ashihara et al. | 342/70 |
| 6,469,659 | B1 | * | 10/2002 | Lajiness et al. | 342/173 |
| 6,606,052 | B1 | * | 8/2003 | Miyahara | 342/70 |
| 6,686,872 | B2 | * | 2/2004 | Vacanti | 342/173 |
| 6,873,250 | B2 | * | 3/2005 | Viana et al. | 340/435 |
| 6,896,082 | B2 | * | 5/2005 | Asanuma et al. | 180/169 |
| 6,954,172 | B2 | * | 10/2005 | Hofmann et al. | 342/173 |
| 7,123,183 | B2 | * | 10/2006 | Shouno et al. | 342/70 |
| 7,148,840 | B2 | * | 12/2006 | Dooi et al. | 342/131 |
| 2002/0154051 | A1 | * | 10/2002 | Yamashita | 342/118 |
| 2002/0180633 | A1 | * | 12/2002 | Nakanishi et al. | 342/70 |
| 2003/0071753 | A1 | * | 4/2003 | Vacanti | 342/173 |

(Continued)

FOREIGN PATENT DOCUMENTS

JP  48-31894 A  4/1973

(Continued)

*Primary Examiner*—Thomas H Tarcza
*Assistant Examiner*—Matthew M Barker
(74) *Attorney, Agent, or Firm*—Sughrue Mion, PLLC

(57) ABSTRACT

A radar device can reliably, and rapidly detect dirt adhered to a radome surface without misdetection. The radar device includes a transmit/receive shared antenna (306) that transmits an electric wave to an object and receives a reflected wave that has been reflected from the object, a mixer (307) that mixes a transmission signal and a reception signal together to generate a beat signal, and a signal processing unit (312) that measures a distance to the object and a relative speed of the object on the basis of the beat signal. The transmit/receive shared antenna (306) modulates an unmodulated wave into a pulse and transmits the pulse modulated wave at a specific timing. In the case where the unmodulated pulse is transmitted, the beat signal that has been generated by the mixer (307) is converted into a digital voltage value by an A/D converter (310). The signal processing unit (312) detects the dirt that is adhered to the radome (314) of the transmit/receive shared antenna (306) on the basis of an output of the A/D converter 310.

14 Claims, 13 Drawing Sheets

U.S. PATENT DOCUMENTS

| | | | |
|---|---|---|---|
| 2005/0007271 A1* | 1/2005 | Isaji | 342/70 |
| 2005/0200833 A1* | 9/2005 | Nakamura et al. | 356/4.07 |
| 2006/0012511 A1* | 1/2006 | Dooi et al. | 342/70 |
| 2006/0055587 A1* | 3/2006 | Mitsumoto | 342/70 |

FOREIGN PATENT DOCUMENTS

| | | |
|---|---|---|
| JP | 07-049378 A | 2/1995 |
| JP | 10-160836 A | 6/1998 |
| JP | 10-282229 A | 10/1998 |
| JP | 2000-19242 A | 1/2000 |
| JP | 2004-286537 A | 10/2004 |

* cited by examiner

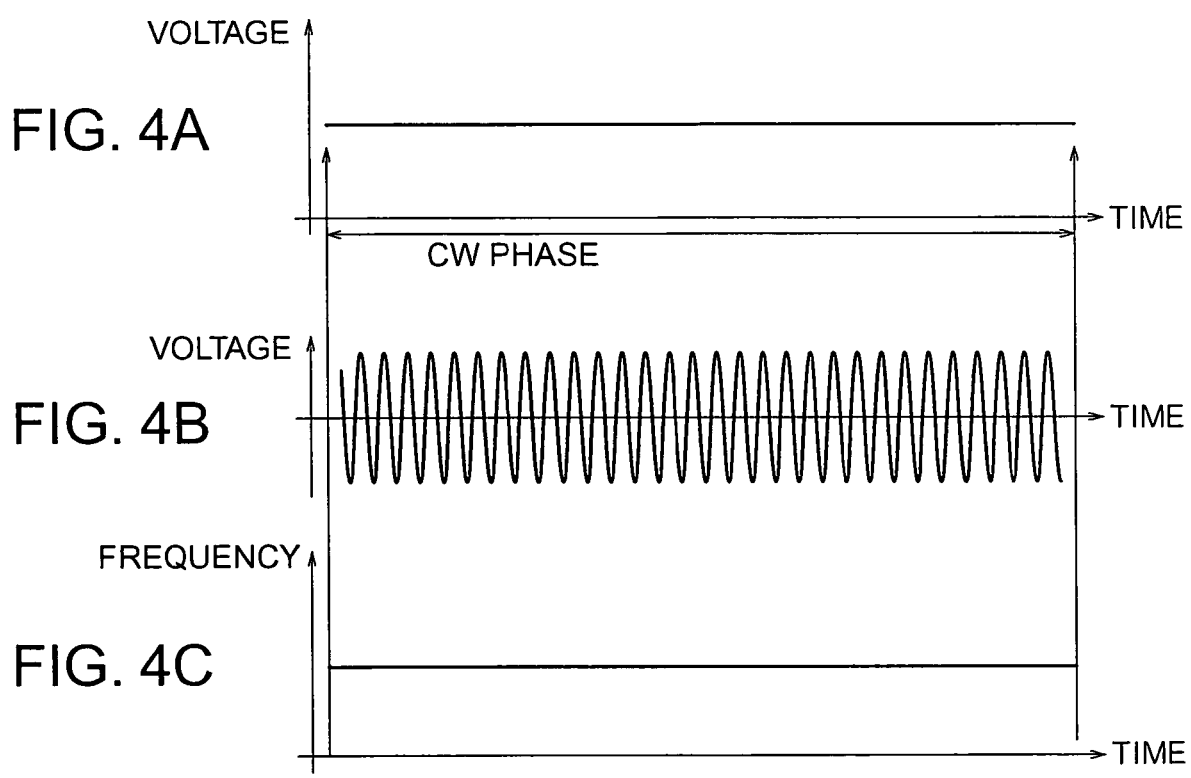

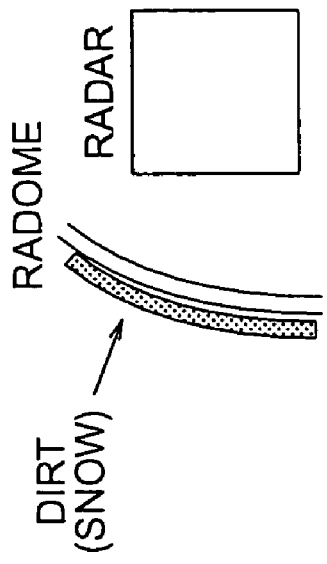
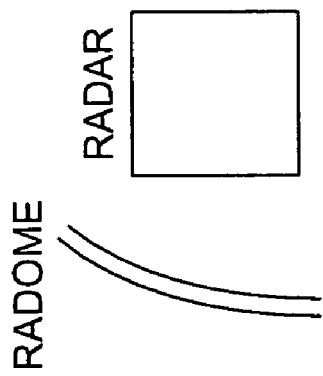
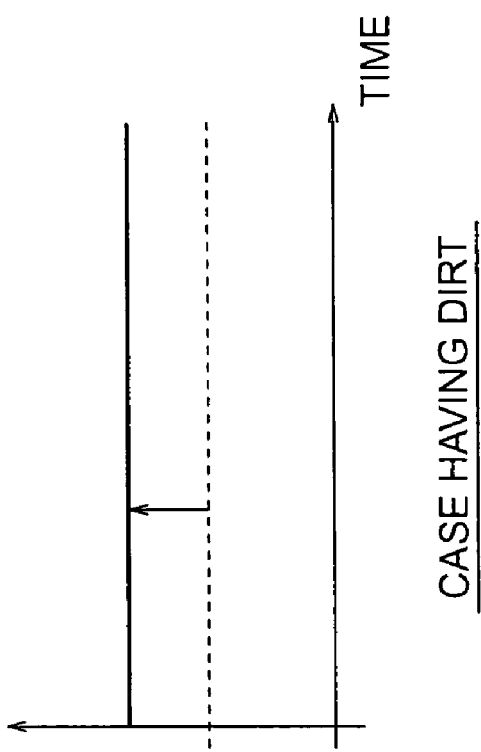
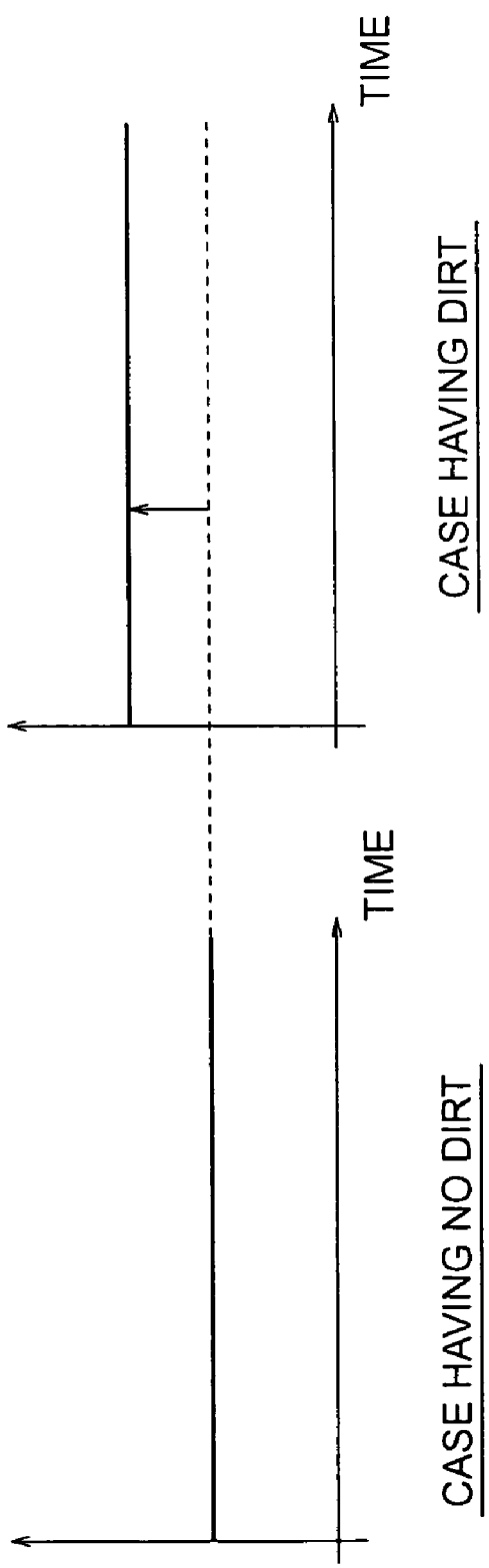

CASE: RELATIVE SPEED = 0

CASE: RELATIVE SPEED ≠ 0

CASE: RELATIVE SPEED ≠ 0

RADAR DEVICE

BACKGROUND OF THE INVENTION

1. Field of the Invention

The present invention relates to a radar device, and more particularly to a radar device that can detect not only an object but also dirt that is adhered to a radome of an antenna on the basis of a reflected signal.

2. Description of the Related Art

As a conventional radar device, there has been proposed an FM radar device that extracts a low frequency component of a beat signal by a low pass filter, performs the extracted low frequency component to A/D conversion by an A/D converter, performs fast Fourier transformation by a fast Fourier transformer, and compares frequency spectrum data, in which a low frequency component in a state where no dirt is adhered to a radome is stored, with inputted frequency spectrum data of a low frequency component to detect that dirt is adhered to the radome (for example, refer to JP 10-282229A).

Also, as another conventional radar device, there has been proposed a radar device that provides another detection threshold value for road surface detection which is different from a normal detection threshold value, and determines that dirt is adhered to the radome in the case where the number of occurrences of the beat signals which exceed the detection threshold value for road surface detection within a given period of time is equal to or smaller than a given value (for example, see JP 2000-019242B)

SUMMARY OF THE INVENTION

There are applications for an in-vehicle radar device such as an adaptive cruise control that conducts cruise control while keeping a distance from a vehicle in front of a subject vehicle constant, and a precrush safety that conducts brake control and controls a pretensioner that tightens a seat belt immediately before a collision to reduce an impact at the time of the collision in the case where there is a possibility that the subject vehicle will collide with the vehicle in front of the subject vehicle or an obstacle.

In the above-mentioned systems, it is very important as a function from the viewpoint of safety to rapidly detect deterioration of a radar performance which is caused by adhesion of dirt or snow on the surface of the radome, without misdetection.

In the FM radar device disclosed in JP 10-282229 A, the dirt on the radome can be detected without embedding another sensor or the like in the radome. However, in the case where a change in the level of the low frequency component is detected in the FM system, because a signal from the object is superimposed on the low frequency component depending on a circumstance where the object is detected on the principle of the FM system, a dirt detection process cannot be executed.

In the FM system, it is general to use a frequency modulated wave consisting of an up phase and a down phase as shown in FIG. 12. That is, in FIG. 12, reference symbol fb1 denotes a beat frequency in the up phase, fb2 denotes a beat frequency in the down phase, fr denotes a beat frequency when a relative speed is 0, and fd denotes a Doppler frequency based on the relative speed. When fb1 and fb2 are measured, separately, fr and fd, that is, a distance from the object and the relative speed of the object can be obtained, independently.

In the case of that system, the beat frequency due to the reflected wave from the object becomes unavoidably a low frequency component in the up phase depending on the circumstance in which the object is detected as shown in FIG. 13, and there occurs a difference from the frequency spectrum data in which the low frequency component is stored in a state where no dirt is adhered to the radome. As a result, there arises such a problem that there is a possibility of conducting misdetection that the dirt is adhered to the radome. Alternatively, it is necessary to prevent a dirt detection process from being implemented under the above circumstance. However, that the dirt detection process is not implemented under a certain condition means that there is a possibility that the dirt detection cannot be implemented quickly.

In the radar device disclosed in JP 2000-019242B, there is used a method of detecting a phenomenon that the level of the reflected wave from a road surface is deteriorated by adhesion of dirt onto the surface of the radome. However, since there are various kinds of road surfaces, and there arises such a problem that there is the possibility of misdetecting those kinds of transitions and the like as the dirt adhesion. Also, there arises such a problem that the circumstance in which the wave is reflected from the road surface depends on the number of occupants, how to drive, and the weather.

The present invention has been made to solve the above problems, and therefore an object of the present invention is to provide a radar device that is capable of rapidly detecting dirt that is adhered to a radome surface reliably without misdetection.

According to the present invention, there is provided a radar device, including: transmitting means for transmitting an electric wave as a transmission signal; receiving means for receiving a reflected wave resulting from reflecting the transmission signal from an object as a reception signal; detecting means which mixes the transmission signal and the reception signal together to generate a beat signal for detecting the object according to the beat signal; measuring means for measuring a distance to the object and a relative speed of the object on the basis of the beat signal; unmodulated pulse transmitting means for modifying an unmodulated wave into a pulse and transmitting the pulse at a specific timing; A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means.

The present invention provides a radar device, including: transmitting means for transmitting an electric wave as a transmission signal; receiving means for receiving a reflected wave resulting from reflecting the transmission signal from an object as a reception signal; detecting means which mixes the transmission signal and the reception signal together to generate a beat signal for detecting the object according to the beat signal; measuring means for measuring a distance to the object and a relative speed of the object on the basis of the beat signal; unmodulated pulse transmitting means for modifying an unmodulated wave into a pulse and transmitting the pulse at a specific timing; A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means. As a result, detection of dirt that is adhered to a radome surface can be made reliably and rapidly without misdetection.

BRIEF DESCRIPTION OF THE DRAWINGS

In the accompanying drawings:

FIGS. 4A to 4C are explanatory diagrams for explaining the operation of the radar device in a dirt detection mode in accordance with the first embodiment of the present invention;

FIGS. 6A and 6B are explanatory diagrams for explaining the dirt detecting method of the radar device in accordance with the first embodiment of the present invention, respectively;

DETAILED DESCRIPTION OF THE PREFERRED EMBODIMENTS

Now, a description will be given in more detail of preferred embodiments of the present invention with reference to the accompanying drawings.

First Embodiment

Figure 1:
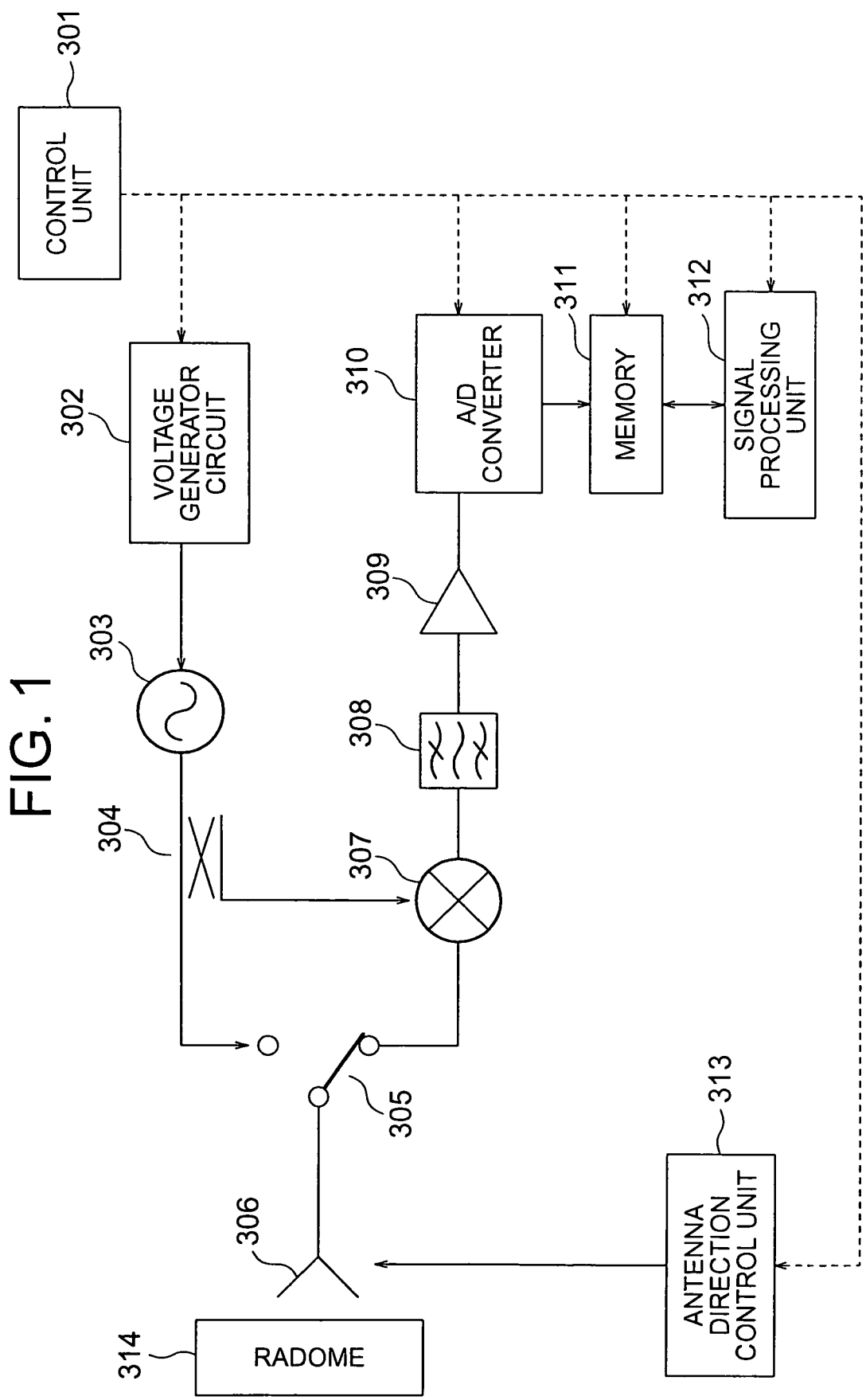
FIG. 1 is a structural diagram showing a structure of a radar device in accordance with a first embodiment of the present invention.

FIG. 1 is a structural diagram showing a structure of an in-vehicle radar device in accordance with a first embodiment of the present invention. As shown in FIG. 1, the in-vehicle radar device according to the first embodiment is constructed of a control unit 301, a voltage generator circuit 302 that generates a modulation signal, a voltage control oscillator (hereinafter referred to as "VCO") 303, a distributor 304, a transmit/receive changeover switch 305, a transmit/receive shared antenna 306, and a mixer 307. The in-vehicle radar device is also constructed of a band pass filter (BPF) 308, an amplifier 309, an analog to digital (hereinafter referred to as "A/D") converter 310, a memory 311, a signal processing unit 312, and an antenna direction control unit 313. Hereinafter, the respective structural elements will be described. Note that, in FIG. 1, solid lines indicate electric connections and broken lines indicate transmission of a control signal.

The control unit 301 controls the operations of the respective structural elements 302 to 313 of the in-vehicle radar device.

Figure 2:
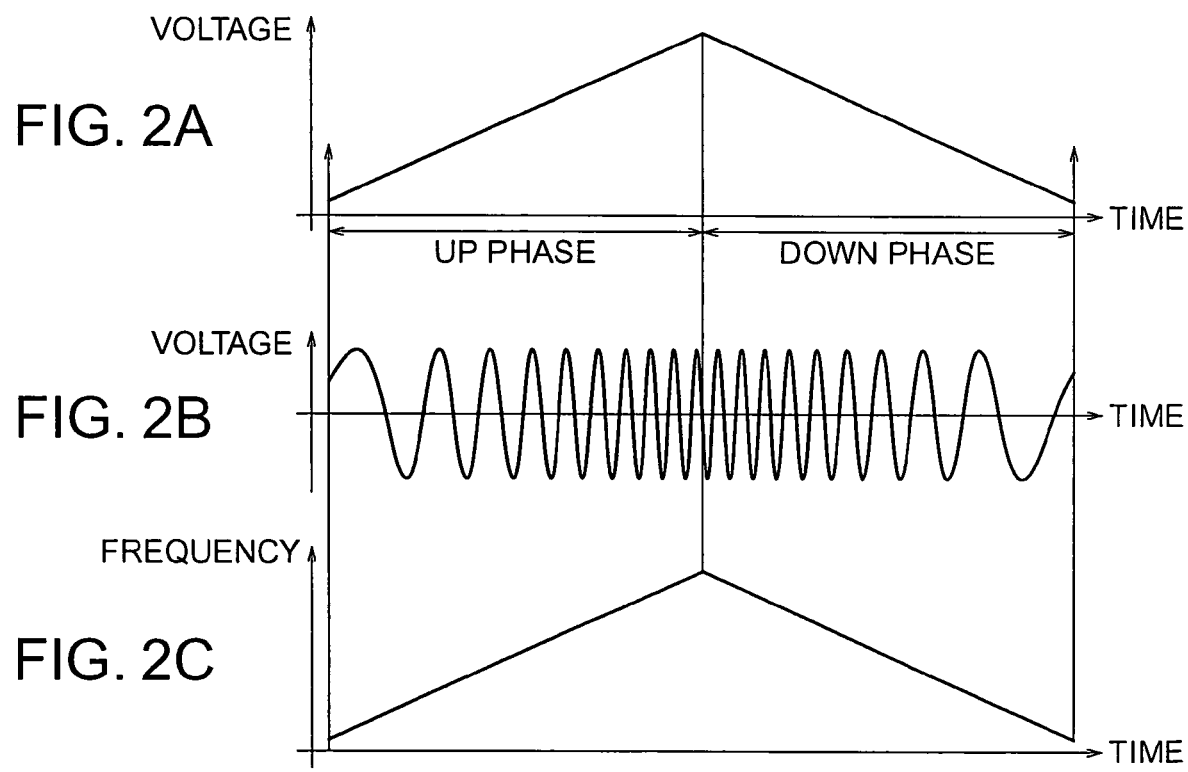
FIGS. 2A to 2C are explanatory diagrams for explaining the transmitting operation of the radar device in accordance with the first embodiment of the present invention.

The voltage generator circuit 302 is controlled in timing by the control unit 301, and generates a voltage shown in FIG. 2A which temporally changes into a chopping wave shape and applies the voltage to the VCO 303 in a normal measurement mode for detecting an object in a normal state. In a dirt detection mode for detecting the dirt adhered to a radome which will be described later, the voltage generator circuit 302 generates a constant voltage shown in FIG. 4A.

The VCO 303 generates a frequency modulated continuous wave that temporally changes in frequency (hereinafter referred to as "FMCW") or an unmodulated wave in accordance with an applied voltage, and outputs the wave to the distributor 304.

The distributor 304 outputs a part of the inputted FMCW and the unmodulated wave to the transmit/receive changeover switch 305 as a transmission signal, and outputs the remaining waves to the mixer 307 as a local signal.

The transmit/receive changeover switch 305 modifies the inputted FMCW or unmodulated wave into a pulse, and outputs the pulse modulated wave to the transmit/receive shared antenna 306.

The transmit/receive shared antenna 306 radiates the inputted transmission signal to a space as a transmitting wave, and receives a reflected wave of the transmitting wave.

The mixer 307 mixes an electric wave (reflected wave) that is received by the transmit/receive shared antenna 306 with the FMCW or the unmodulated wave from the VCO 303 to generate a beat signal.

The band pass filter (BPF) 308 allows the generated beat signal to pass therethrough, thereby allowing a frequency band of the beat signal corresponding to a given detection distance range (detection range) to pass therethrough.

The amplifier 309 amplifies the beat signal that has passed through the band pass filter 308.

The A/D converter 310 inputs the beat signals amplified in the respective distance gates to convert those beat signals into digital signals.

The memory 311 stores the digital signal that is outputted from the A/D converter 310 therein.

The signal processing unit 312 inputs an A/D value of the beat signal in the up phase or an A/D value of the beat signal in the down phase at the time when the observation period of the up phase or the down phase has been completed by the control unit 301. Then, the signal processing unit 312 calculates a distance, a speed, and an azimuthal angle of a target, and outputs the calculated results to other devices (a motion control device, a display device of a mobile, or the like).

The antenna direction control unit 313 receives a control signal from the control unit 301, and changes the direction of the transmit/receive shared antenna 306 on the basis of the received control signal. That is, the direction of the electric wave beam which is radiated from the transmit/receive shared antenna 306 is variable.

In this example, the transmit/receive shared antenna 306 is provided with a radome 314 that covers a radiation portion (opening portion) of an electric wave in order to protect the transmit/receive shared antenna 306. A freeze, a snow accretion, or dirt is adhered to the radome 314. The radar device according to the present invention can detect not only an object but also the dirt of the radome 314.

Subsequently, the operation will be described.

First, the transmitting operation will be described. First, the voltage generator circuit 302 that is controlled in timing by the control unit 301 generates a voltage shown in FIG. 2A which temporally changes in a chopping wave shape, and applies the voltage to the VCO 303. The VCO 303 generates the FMCW that temporally changes the frequency according to the applied voltage, and then outputs the FMCW to the distributor 304. In terms of the FMCW, a voltage change with respect to time is shown in FIG. 2B, and a frequency change with respect to time is shown in FIG. 2C. The distributor 304 outputs a part of the inputted FMCW to the transmit/receive changeover switch 305 as a transmission signal, and outputs the remaining waves to the mixer 307 as a local signal. The transmit/receive changeover switch 305 modulates the inputted FMCW into a pulse, and outputs the modulated signal to the transmit/receive shared antenna 306. The transmit/receive shared antenna 306 radiates the inputted transmission signal to a space as a transmitting wave. Thus, the voltage generator circuit 302, the VCO 303, the switch 305 and the transmit/receive shared antenna 306 constitute transmitting means for transmitting an electric wave as the transmission signal.

Figure 3:
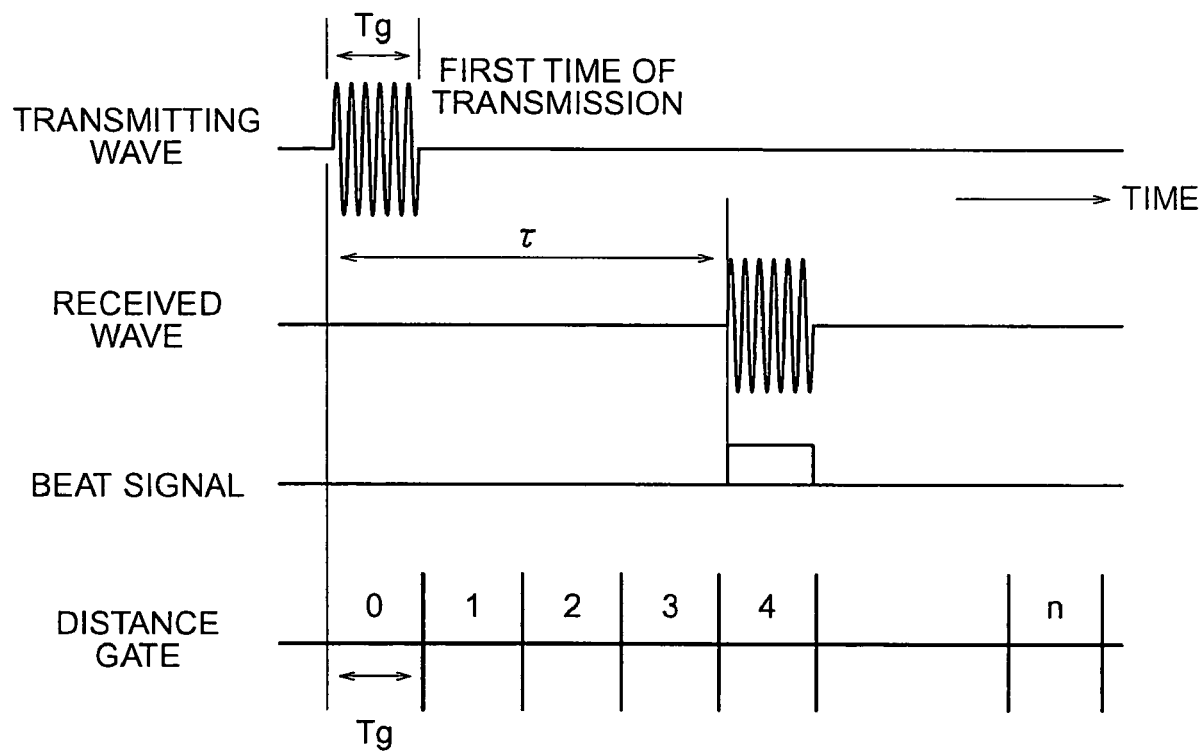
FIG. 3 is an explanatory diagram for explaining the receiving operation of the radar device in accordance with the first embodiment of the present invention.

Then, the receiving operation will be described. At the time when a pulse time width Tg (for example, 66.6 ns: equivalent of 10 m in a distance) elapses from a transmission start time, the transmit/receive changeover switch 305 is changed over to a receiving side (FIG. 1 shows a state in which the transmit/receive changeover switch 305 is changed over to the receiving side). The electric wave that has been radiated from the transmit/receive shared antenna 306 becomes a pulse wave that is outputted by the pulse time width Tg, and is inputted to the transmit/receive shared antenna 306 (receiving means) with a delay time τ corresponding to a distance R from an object. Thereafter, the pulse wave is mixed with the FMCW from the VCO 303 through the distributor 304 by the mixer 307 to output the beat signal as shown in FIG. 3 (detecting means). In this example, FIG. 3 shows the transmitting wave, the received wave, the beat signal, and the distance gate in the order from above, respectively. The obtained beat signal passes through the band pass filter 308, and is amplified by the amplifier 309. The beat signal is then inputted to the A/D converter 310 in each of the distance gates, converted into a digital signal, and outputted to the memory 311. The memory 311 is capable of reading the recorded A/D value when the observation period of the up phase or the down phase has been ended by the control unit 301.

The signal processing unit 312 is constructed of, for example, a CPU (central processing unit), or the CPU and a DSP (digital signal processor). At the time when the observation period of the up phase or the down phase has been ended by the control unit 301, the A/D value of the beat signal in the up phase or the A/D value of the beat signal in the down phase is inputted to the signal processing unit 312. On the basis of the inputted A/D value, the signal processing unit 312 (measuring means) calculates the distance, the speed, and the azimuthal angle of the target, and outputs the calculated result to other devices (a motion control unit, a display unit of a mobile, or the like) (normal measurement mode).

The above operation is implemented while the antenna direction control unit 313 changes the direction of the transmit/receive shared antenna 306 by the control unit 301, that is, while the direction of the electric wave beam which is radiated from the transmit/receive shared antenna 306 is changed.

Subsequently, a description will be given as to the operation of another dirt detection mode for the purpose of detecting dirt which is different from the above normal measurement mode.

In a given beam direction, a constant voltage is developed from the voltage generator circuit 302 (refer to FIG. 4A) and is applied to the VCO 303. In this case, the unmodulated continuous wave (that is, unmodulated pulse) is outputted from the VCO 303, and then inputted to the distributor 304. In terms of the unmodulated continuous wave, a voltage change with respect to time is shown in FIG. 4B, and a frequency change with respect to time is shown in FIG. 4C. The distributor 304 outputs a part of the inputted unmodulated continuous wave to the transmit/receive changeover switch 305 as the transmission signal, and outputs the remaining waves to the mixer 307 as the local signal. The transmit/receive changeover switch 305 modifies the inputted unmodulated continuous wave into a pulse, and outputs the modified signal to the transmit/receive shared antenna 306. The transmit/receive shared antenna 306 radiates the inputted transmission signal to a space as the transmitting wave. In this example, the voltage generator circuit 302, the VCO 303, the antenna 306 and the transmit/receive changeover switch 305 constitute the unmodulated pulse transmitting means that modulates the unmodulated wave into a pulse and transmits the unmodulated wave at a specific timing (in this example, at the time of a given beam direction). The above-mentioned normal measurement mode is applied to the receiving operation except that the FMCW becomes the unmodulated continuous wave. In this example, the A/D converter 310 constitutes A/D converting means that converts the beat signal from the signal processing unit 312 (detecting means) into a digital voltage value in the case where the unmodulated pulse is transmitted at the specific timing.

Then, a description will be given as to a dirt detecting method in the dirt detection mode that transmits the unmodulated pulse wave.

Figure 5B:
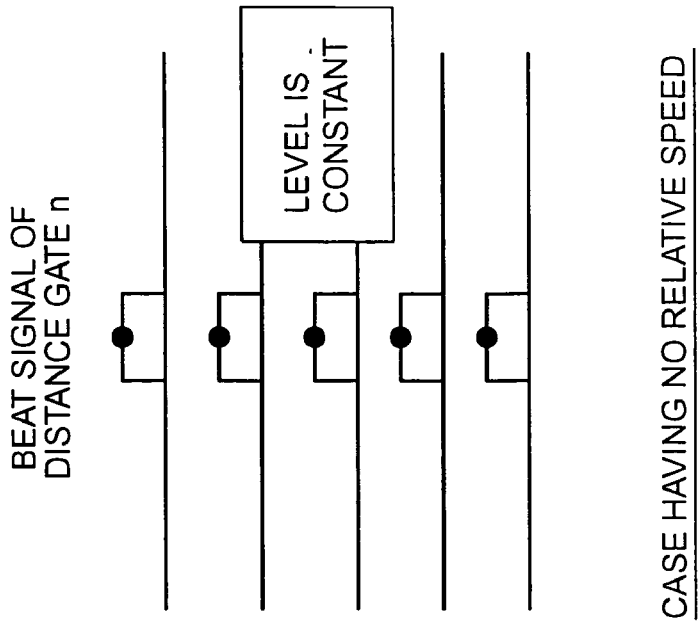
FIGS. 5A and 5B are explanatory diagrams for explaining a dirt detecting method of the radar device in accordance with the first embodiment of the present invention, respectively.
Figure 5A:
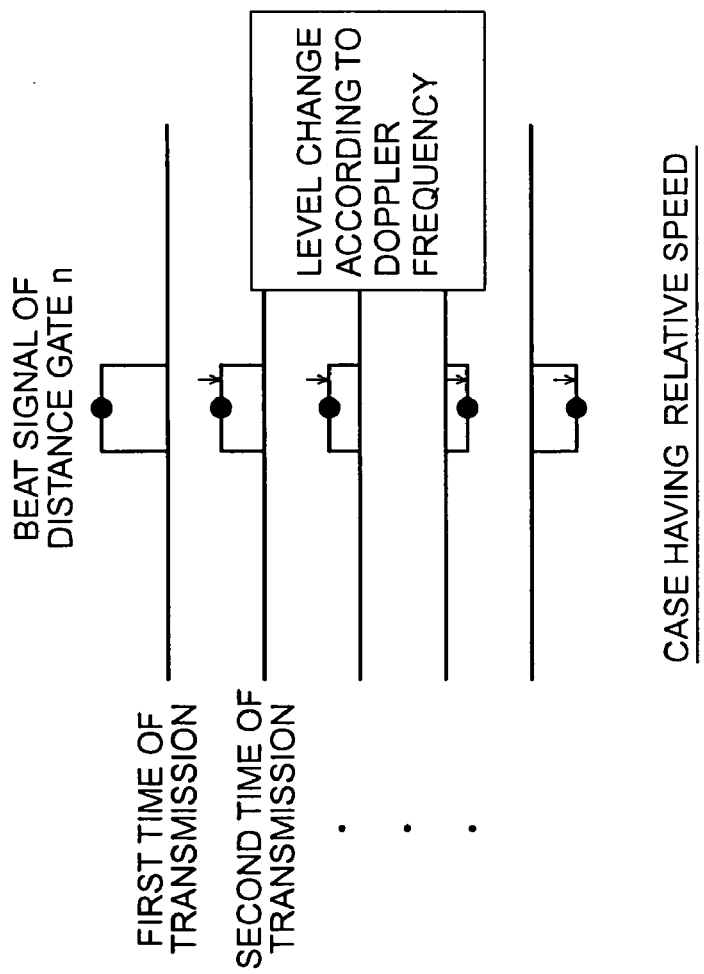

In the case of using the unmodulated pulse, since only the Doppler frequency component is outputted from the mixer 307, the output from the mixer 307 changes according to the Doppler frequency as shown in FIG. 5A when the object has a relative speed. However, when the object has no relative speed, the output from the mixer 307 becomes a constant level that is determined according to the phase relationship between the transmission signal and the reception signal and the receiving intensity of the reception signal, as shown in FIG. 5B.

Therefore, as shown in FIG. 6, in the case where an attention is paid to the distance gate corresponding to the shortest distance, the A/D value when there is dirt and the A/D value when there is no dirt are different in level from each other due to the reflection from the dirt per se (the A/D value when there is dirt is higher). For that reason, the signal processing unit 312 learns the A/D value when there is no dirt and stores the A/D value in the memory 311, and compares the level of the A/D value with the level of the A/D level stored in the memory 311, thereby being capable of detecting the presence or absence of the dirt.

Moreover, since the A/D value of the shortest distance is constant and does not change in level so far as no object exists at the shortest distance, when the unmodulated pulse is used, the dirt can be detected without misdetection. Additionally, since the dirt judging can be implemented so far as no object exists at the shortest distance, the dirt can be detected rapidly.

As described above, the signal processing unit 312 constitutes not only the measuring means in the normal measurement mode, but also the dirt detecting means that detects the dirt adhered to the radome of the transmit/receive shared antenna 306 on the basis of the A/D value that is outputted from the A/D converter 310.

Figure 7:
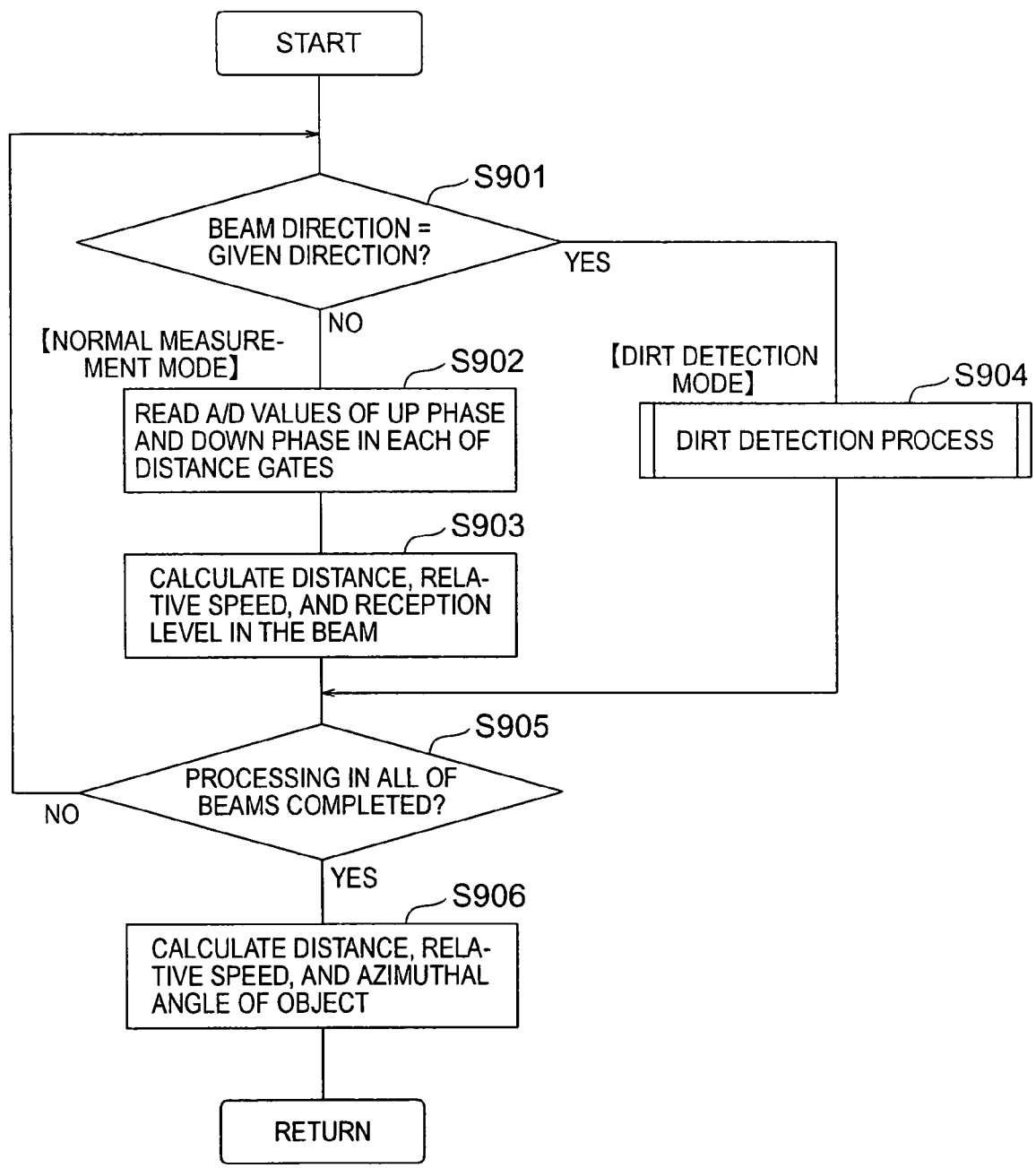
FIG. 7 is a flowchart showing a signal processing flow of the radar device in accordance with the first embodiment of the present invention.

FIG. 7 shows a signal processing flowchart.

First, in Step S901, it is determined whether the control beam direction coincides with a given direction, or not, and if the beam direction is not the given direction, the processing advances to Step S902, and if the beam direction is the given direction, the processing advances to Step S904. In Step S902, the A/D values of the up phase and the down phase are read in each of the distance gates (normal measurement mode). Then, the distance, the relative speed, and the reception level in the beam are calculated on the basis of the read A/D values in Step S903. On the other hand, the dirt detection process is executed in Step S904 (dirt detection mode). The dirt detection process in Step S904 is conducted according to a flowchart shown in FIG. 8 which will be described later. Upon completion of the processings of Steps S903 and S904, the processing advances to Step S905, respectively. In Step S905, it is determined whether the processings of all of the beams have been completed, or not, and if the processings have been completed, the processing advances to Step S906. If the processings have not been completed, the processing returns to Step S901. In Step S906, the distance, the relative speed, and the azimuthal angle of the target are calculated according to the distance, the relative speed, and the reception level in each of the beams.

Subsequently, a description will be given as to the dirt detection process conducted by the signal processing unit 312 in Step S904.

Figure 8:
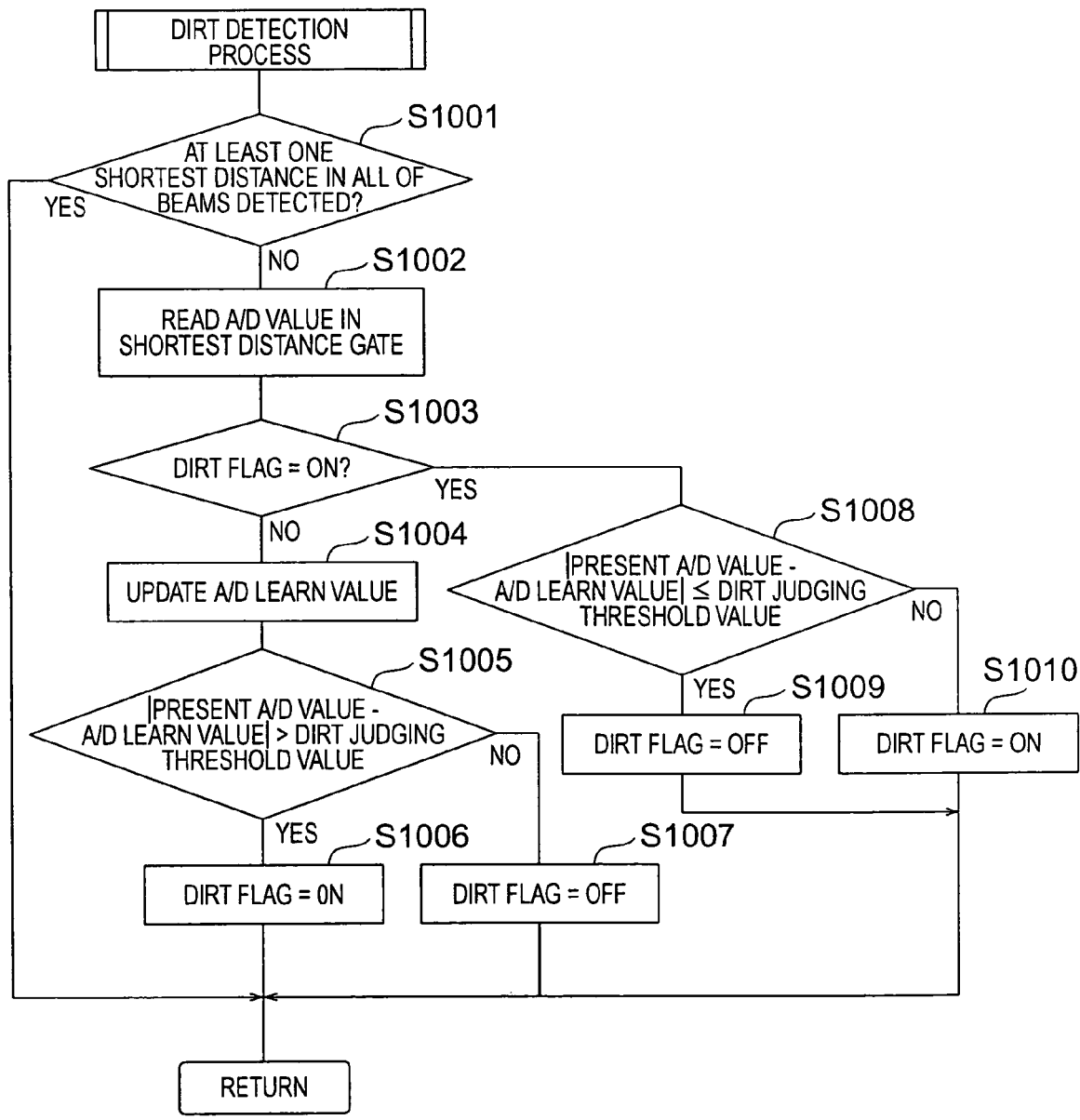
FIG. 8 is a flowchart showing a dirt detection flow of the radar device in accordance with the first embodiment of the present invention.

FIG. 8 shows a flowchart of the dirt detection process.

First, in Step S1001, it is checked out whether the shortest distance (for example, 10 m or less) is detected, or not, in all of the beams. If at least one shortest distance is detected, the processing is ended. On the other hand, if the shortest distance is not detected in all of the beams, the processing advances to Step S1002. Step S1001 prevents the misdetection of the dirt judging. The A/D value in the shortest distance gate (for example, the minimum distance gate) is read in Step S1002. It is detected in Step S1003 whether a dirt flag is on or off. If the dirt flag is on, the processing advances to Step S1008, and if the dirt flag is off, the processing advances to Step S1004.

In Step S1004, the A/D learn value is updated. For example, a moving average value is calculated by using the past A/D value when no dirt is adhered to the radome 314. In Step S1005, an absolute value X of a difference between the A/D value which is inputted this time and the A/D learn value is calculated, and a predetermined dirt judging threshold value is compared with the absolute value X of the difference. In the case where the absolute value X of the difference is larger than the dirt judging threshold value, the processing advances to Step S1006, and in other cases, the processing advances to Step S1007. The dirt flag is turned on in Step S1006. The dirt flag is turned off in Step S1007. Alternatively, in Step S1006, not only the dirt flag is turned on, but also a command signal is outputted so as to display a message indicative of the dirt detection in a display device (not shown). Alternatively, a voice synthesizer may be provided with the display device so as to announce the dirt detection by a voice message.

In Step S1008, an absolute value X of a difference between the A/D value which is inputted this time and the A/D learn value is calculated, and the absolute value X of the difference is compared with a predetermined dirt return threshold value. In the case where the absolute value X of the difference is equal to or smaller than the dirt return threshold value, the processing advances to Step S1009, and in other cases, the processing advances to Step S1010. The dirt flag is turned off in Step S1009. The dirt flag is turned on in Step S1010.

As described above, according to this embodiment, since the unmodulated pulse is used in order to detect the dirt apart from the normal measurement by the FM system, the dirt that may be adhered to the radome surface can be reliably detected without misdetection. In addition, the condition under which the dirt judging cannot be executed can be set only at the time when the object at the shortest distance is detected, by using the unmodulated pulse, thereby making it possible to detect the dirt rapidly. Also, since the dirt judging is conducted in the given beam direction as a specific timing, the dirt judging process can be automatically conducted without an instruction from a user. Therefore, this process is useful. In the normal measurement mode, since the object is detected in all of the directions while changing the direction of the electric wave beam, detection with high precision can be conducted. Further, since the A/D learn value for judging of the dirt is updated as needed, and the present A/D value and the A/D learn value are compared with each other to determine the dirt, it is possible to always conduct the dirt judging with high precision according to the use circumstance as compared with a case where a fixed value is used as the A/D learn value.

Also, in this embodiment, there is provided an example that the dirt detection is determined assuming that the specific timing is made only at the time of the given beam direction. Alternatively, the dirt detection may be determined every predetermined measurement cycle, or the dirt judging may be implemented in all of the beam directions in each of the given measurement cycles. In this case, since the dirt judging is conducted in all of the beams, the dirt can be more reliably detected.

In addition, it is possible to change the beam direction to given beam directions different in each of the measurement cycles to implement the dirt judging. As described above, in the case of the method of implementing the dirt judging in all of the beam directions in each of the predetermined measurement cycles, the dirt can be reliably detected, but the normal measurement cannot be conducted in the measurement cycles, and a measurement delay occurs. For that reason, the beam direction is changed in the beam directions different in each of the measurement cycles bits by bits, and the change is repeated the given number of times to complete the dirt judging in all of the beam directions. As a result, the dirt can be reliably detected without any occurrence of the measurement delay.

Second Embodiment

A description will be given as to an in-vehicle radar device according to a second embodiment of the present invention. The structure of the in-vehicle radar device according to this embodiment is basically identical with that in FIG. 1, and therefore FIG. 1 is referred to and its description will be omitted.

Hereinbelow, the transmitting operation will be described.

Figures 9A, 9B, 9C:
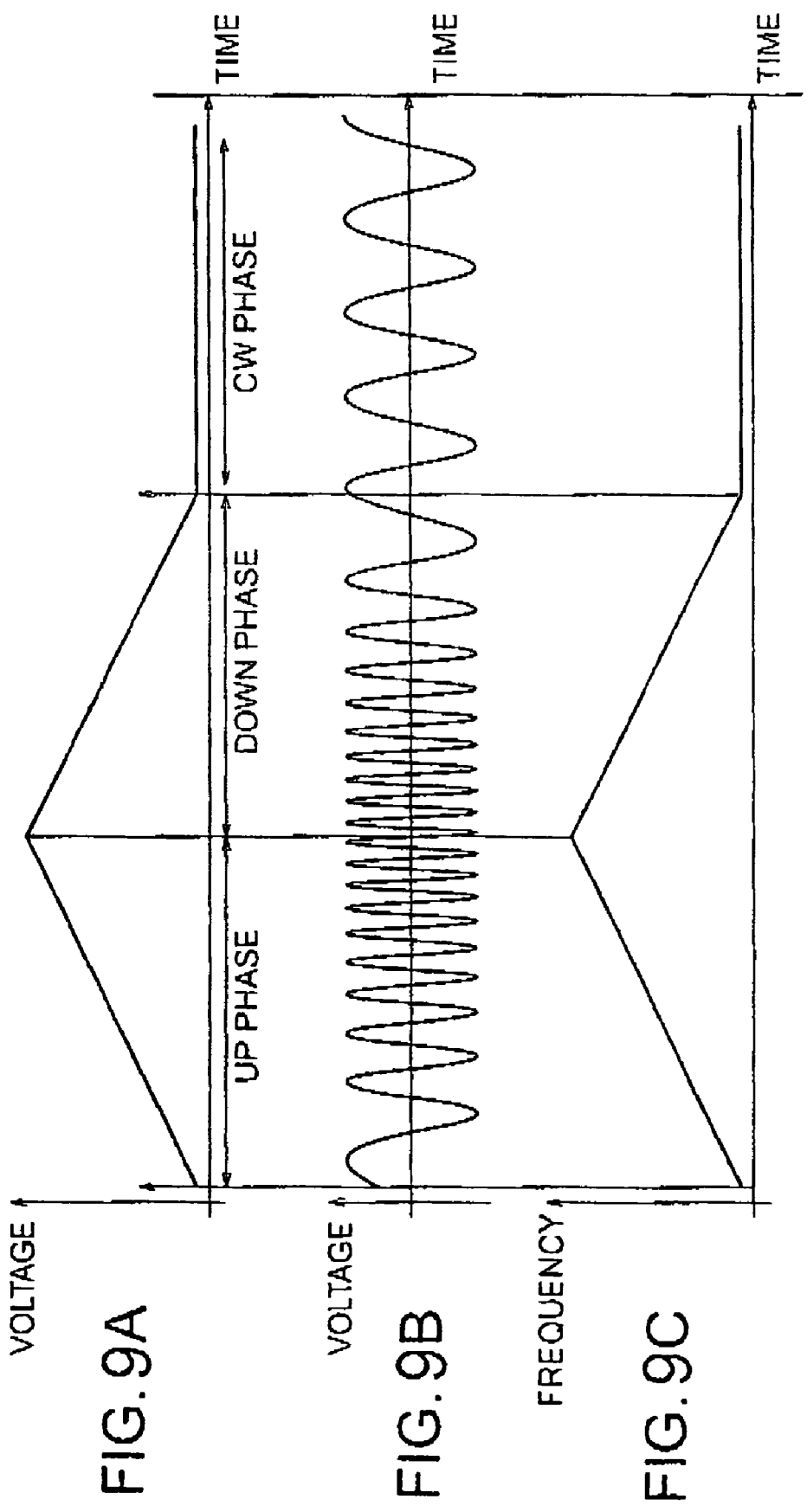
FIGS. 9A to 9C are explanatory diagrams for explaining the transmitting operation of the radar device in accordance with a second embodiment of the present invention.

First, the voltage generator circuit 302 that is controlled in timing by the control unit 301 generates a voltage shown in FIG. 9A which temporally changes from a chopping wave shape into a constant voltage, and applies the voltage to the VCO 303. The VCO 303 generates a frequency modulated continuous wave (FMCW) that temporally changes the frequency and an unmodulated continuous wave according to the applied voltage, and then outputs the FMCW to the distributor 304. In terms of those continuous waves, a voltage change with respect to time is shown in FIG. 9B, and a frequency change with respect to time is shown in FIG. 9C. The distributor 304 outputs a part of the inputted continuous waves to the transmit/receive changeover switch 305 as a transmission signal, and outputs the remaining waves to the mixer 307 as a local signal. The transmit/receive changeover switch 305 modifies the inputted continuous waves into a pulse, and outputs the modified signal to the transmit/receive shared antenna 306. The transmit/receive shared antenna 306 radiates the inputted transmission signal to a space as a transmitting wave.

Then, the receiving operation will be described.

At the time when a pulse time width Tg (for example, 66.6 ns: equivalent of 10 m in a distance) elapses from a transmission start time, the transmit/receive changeover switch 305 is changed over to a receiving side. The electric wave that has been radiated from the transmit/receive shared antenna 306 becomes a pulse wave that is outputted by the pulse time width Tg, and is inputted to the transmit/receive shared antenna 306 with a delay time τ corresponding to a distance R from an object. Thereafter, the pulse wave is mixed with the continuous waves from the VCO 303 by the mixer 307 to output the beat signal as shown in FIG. 3. The obtained beat signal passes through the band pass filter 308, and is amplified by the amplifier 309. The beat signal is then inputted to the A/D converter 310 in each of the distance gates, converted into a digital signal, and outputted to the memory 311. The memory 311 is capable of reading the recorded A/D value when the observation period of the up phase or the down or CW phase has been ended by the control unit 301.

Figure 10:
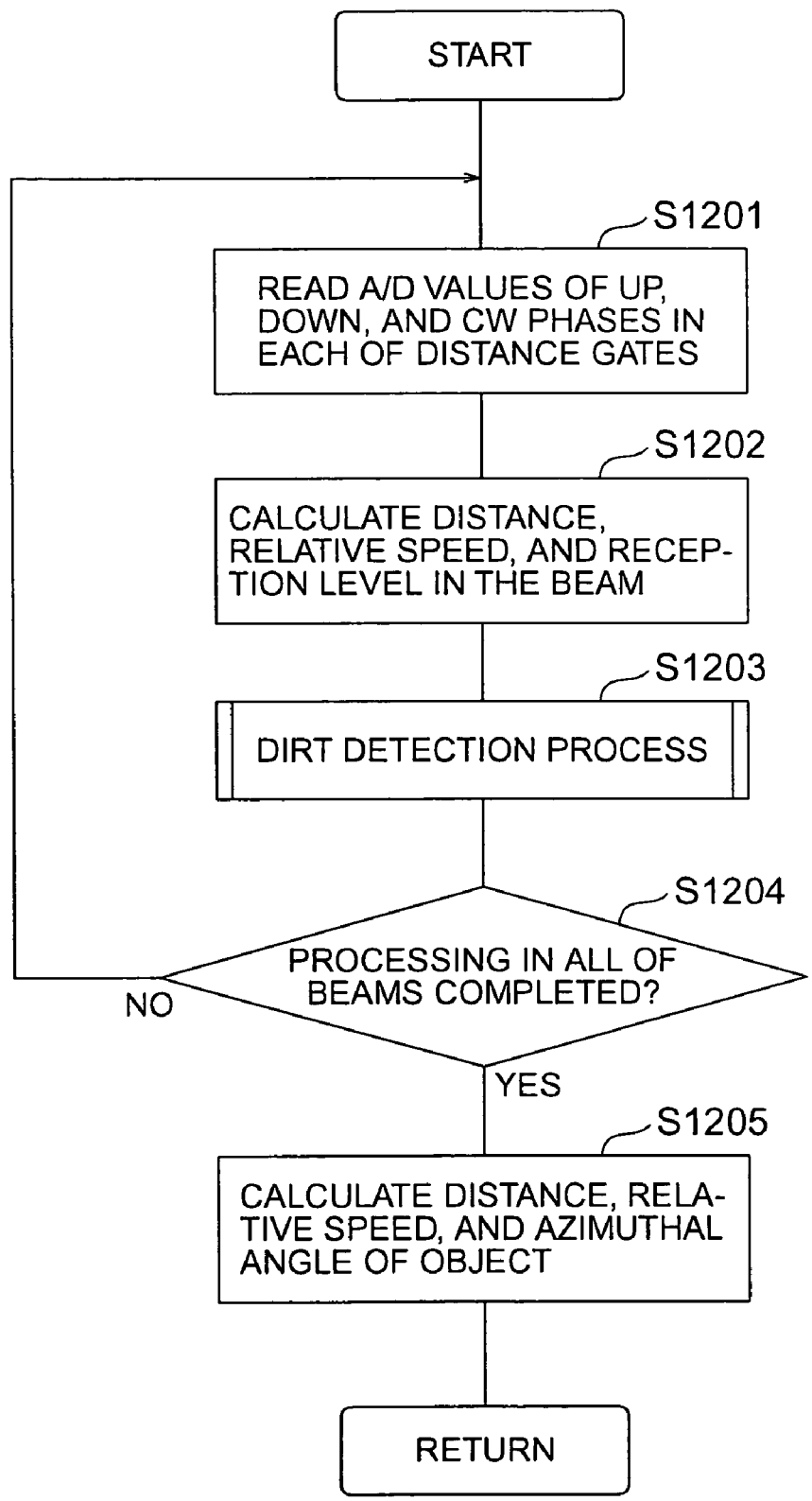
FIG. 10 is a flowchart showing a signal processing flow of the radar device in accordance with the second embodiment of the present invention.

FIG. 10 shows a signal processing flowchart.

First, in Step S1201, the A/D values of the up phase, the down phase, and the CW phase are read in each of the distance gates. Then, the distance, the relative speed, and the reception level in the beam are calculated on the basis of the read A/D values in Step S1202. At this time, since information on the CW phase (Doppler frequency) can be also used, the relative speed can be reliably obtained, so the distance can also be reliably obtained. Next, the dirt detection process is executed in Step S1203. The dirt detection process in Step S1204 will be described later. Then, it is determined whether processing of all of the beams has been completed or not, and if the processing has been completed, the processing advances to Step S1205. If the processing has not been completed, the processing returns to Step S1201. In Step S1205, the distance, the relative speed, and the azimuthal angle of each beam are calculated according to the distance, the relative speed, and the reception level in each of the beams.

Figure 11:
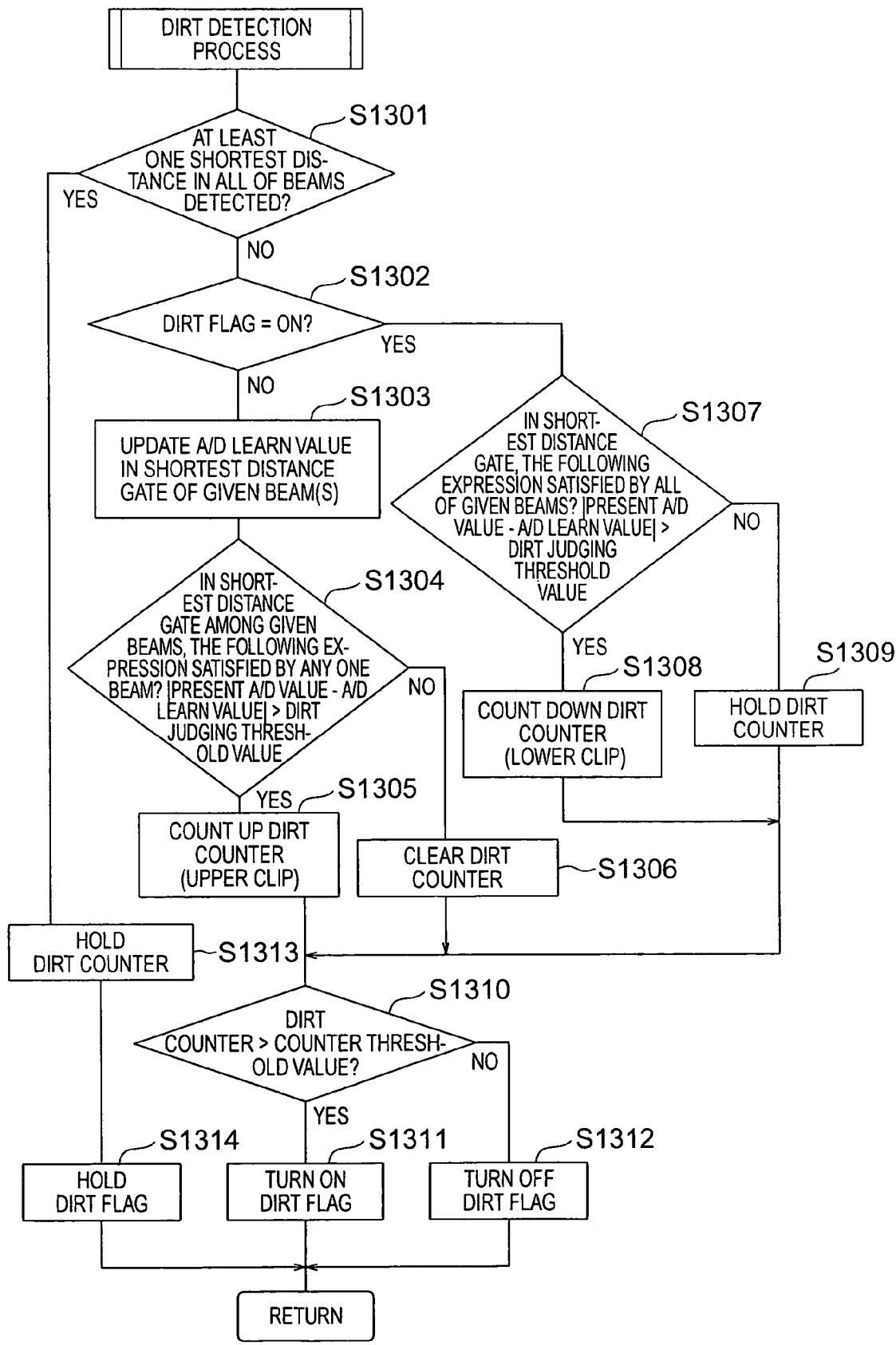
FIG. 11 is a flowchart showing a dirt detection flow of the radar device in accordance with the second embodiment of the present invention.
Figure 12A:
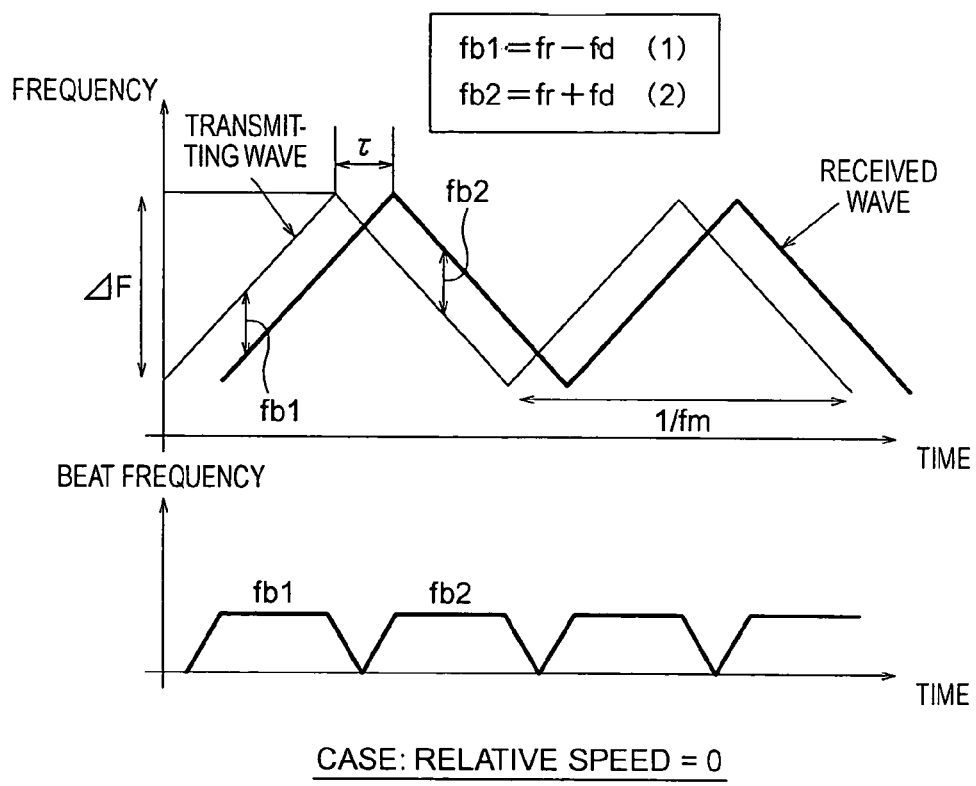
FIGS. 12A and 12B are explanatory diagrams showing a principle of an FM system, respectively.
Figure 12B:
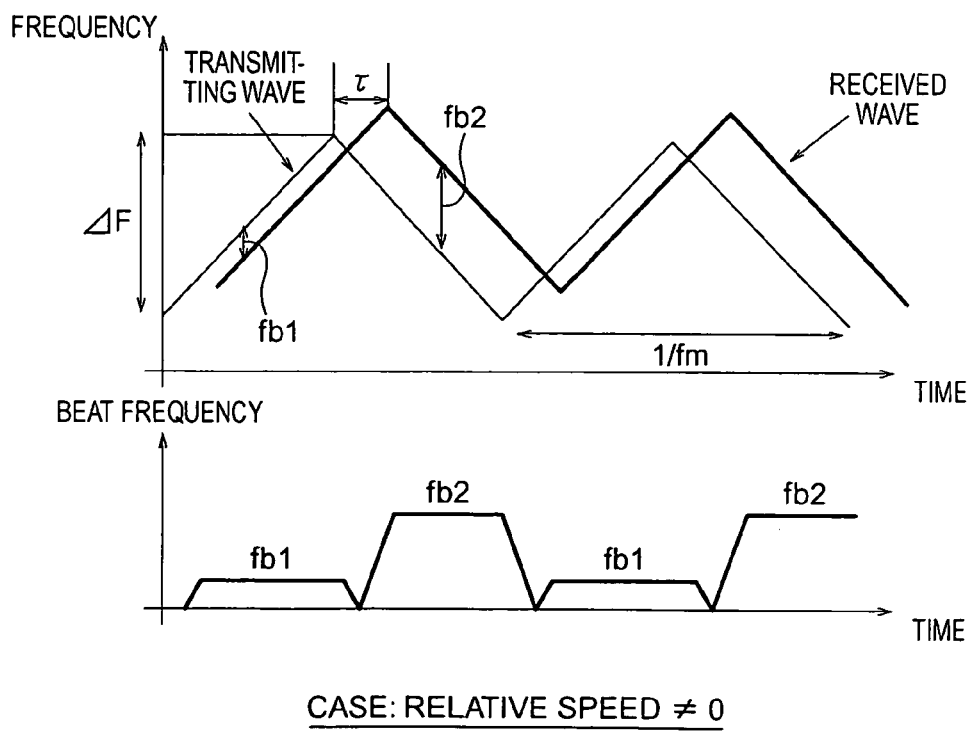
Figure 13:
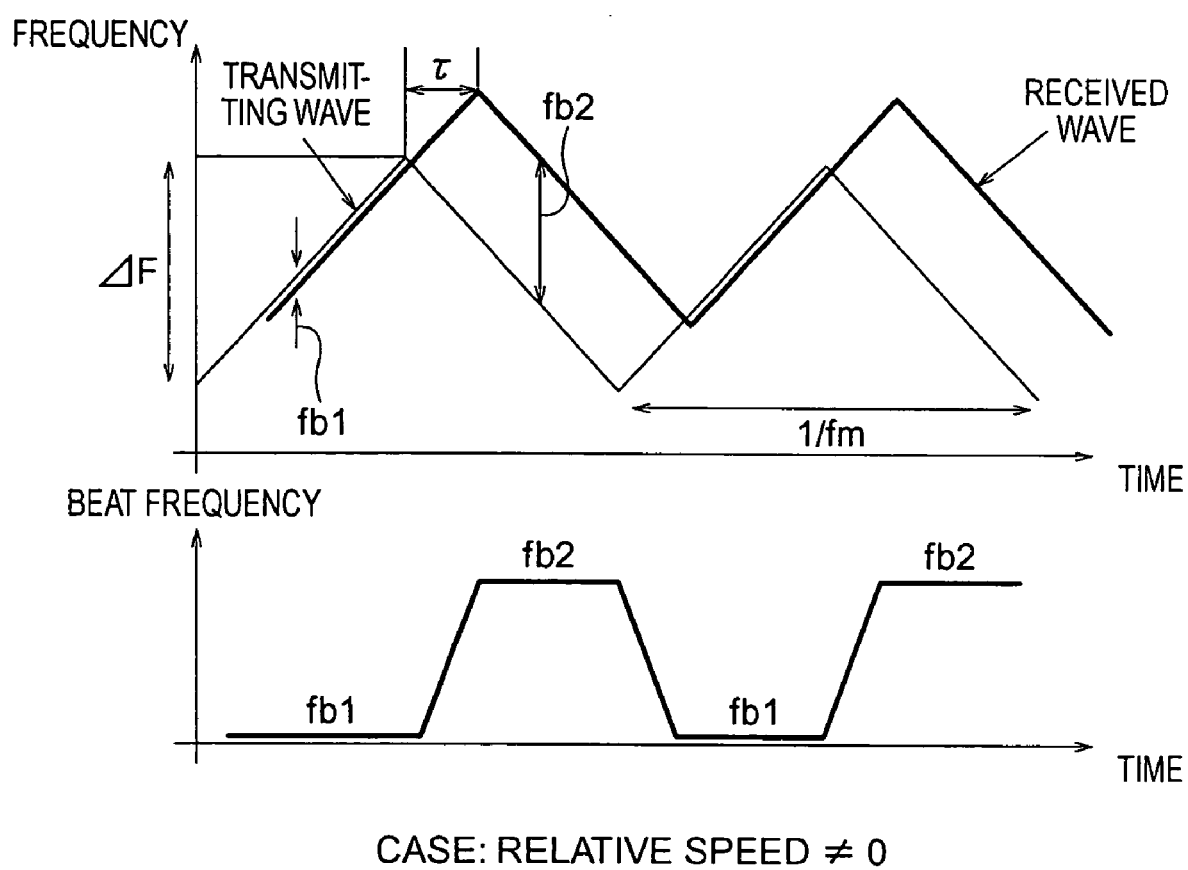
FIG. 13 is an explanatory diagram for explaining a conventional problem at the time of detecting dirt in the FM system.

Subsequently, a description will be given as to the dirt detection process of Step S1203. FIG. 11 shows a flowchart of the dirt detection process.

First, in Step S1301, it is determined whether at least one shortest distance (for example, 10 m or shorter) is detected in all of the beams, or not, and in the case where the shortest distance is not detected in any beams, the processing advances to Step S1302, and in other cases, the processing advances to Step S1313. Step S1313 will be described later. In Step S1313, a dirt flag is checked out, and if the dirt flag is turned on, the processing advances to Step S1307. If the dirt flag is turned off, the processing advances to Step S1303. In Step S1303, the A/D learn value in the given beam is updated. For example, a moving average value is calculated by using the past A/D value when no dirt is adhered to the radome 314. Then, in step S1304, an absolute value X of a difference between the present A/D value and the A/D learn value in the shortest distance gate is calculated, and then compared with a dirt judging threshold value. In the case where there exists at least one beam having the absolute value X of the difference which is larger than the dirt judging threshold value, the processing advances to Step S1305, and in other cases, the processing advances to Step S1306. In Step S1305, the dirt counter is counted up (there is an upper clip). In Step 1306, the dirt counter is cleared up.

On the other hand, in Step S1307, an absolute value X of a difference between the present A/D value and the A/D learn value is calculated, and then is compared with a dirt return threshold value. In the case where the absolute value X of the difference is equal to or smaller than the dirt return threshold value in all of the given beams, the processing advances to Step S1308, and in other cases, the processing advances to Step S1309. The dirt counter is counted down in Step S1308 (there is a lower clip). The dirt counter is held in Step S1309.

All of Steps S1305, S1306, S1308, and S1309 are advanced to Step S1310. In Step S1310, the dirt counter and the counter threshold value are compared with each other, and in the case where the dirt counter is larger than the counter threshold value, it is determined that a given period of time has elapsed, and the processing advances to Step S1311. In other cases, the processing advances to Step S1312. The dirt flag is turned on in Step S1311. The dirt flag is turned off in Step S1312. In the case where the A/D learn value that is learned on the basis of the past output of the A/D converter 310 and the inputted A/D value are compared with each other through the above counter processing, and the difference that is equal to or larger than the predetermined threshold value continues for a given period of time or longer, it is determined that the dirt is adhered to the radome 314.

The dirt counter is held in Step S1313, and the dirt flag is held in Step S1314.

As described above, according to this embodiment, since three phases consisting of up, down, and CW are used, the distance and the relative speed can be reliably obtained. Also, since the A/D value for detection of the dirt can be acquired in the CW phase (unmodulated), the dirt adhered to the radome surface can be reliably detected without misdetection. Also, the condition under which the dirt judging cannot be executed can be set only at the time when the object at the shortest distance is detected, by using the unmodulated pulse, thereby making it possible to detect the dirt rapidly. Also, since all of the phases have the CW phase, the dirt can be detected in plural beams, and the dirt can be more reliably detected. Also, since the up, down, and CW phases are provided in all of the beams, and the normal measurement can be conducted, it is advantageous that the measurement is not delayed. Further, in the case where the A/D learn value that is learned on the basis of the past output of the A/D converting means and the inputted A/D value are compared with each other, and the difference that is equal to or larger than the predetermined threshold value continues for a given period of time or longer, it is determined that the dirt is adhered to the radome. Accordingly, the misdetection due to a noise and the like can be prevented, and the dirt of the radome can be reliably detected.

What is claimed is:

1. A radar device, comprising:

transmitting means for transmitting an electric wave as a transmission signal from a common antenna, a direction of transmission for said transmission signal by said antenna being one of a plurality of predetermined transmission directions;

receiving means for receiving a reflected wave resulting from reflecting the transmission signal from an object as a reception signal;

detecting means which mixes the transmission signal and the reception signal together to generate a beat signal for detecting the object therefrom;

measuring means for measuring a distance to the object and a relative speed of the object on the basis of the beat signal;

unmodulated pulse transmitting means for modifying an unmodulated wave into a pulse and transmitting the pulse from said common antenna in one of said plurality of predetermined transmission directions;

A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means, wherein the transmitting means selectively transmits the transmission signal in said plurality of predetermined transmission directions of an electric wave beam at a respective predetermined timing, and wherein the unmodulated pulse transmitting means selectively transmits the unmodulated pulse in a given one or more of said plurality of predetermined transmission directions at a specific timing based on a current direction of a transmission signal from said transmitting means.

2. A radar device according to claim 1, wherein the unmodulated pulse transmitting means transmits an unmodulated pulse in each of given measurement cycles which are predetermined as the specific timing.

3. A radar device according to claim 1, wherein the dirt detecting means compares an A/D learn value that is learned on the basis of a past output of the A/D converting means with an inputted A/D value, and determines that dirt is adhered to the radome in the case where a difference between the A/D learn value and the inputted A/D value is equal to or larger than a predetermined threshold value.

4. A radar device according to claim 1, wherein the dirt detecting means compares an A/D learn value that is learned on the basis of a past output of the A/D converting means with an inputted A/D value, and determines that dirt is adhered to the radome in the case where a difference between the A/D learn value and the inputted A/D value which is equal to or larger than a predetermined threshold value continues for a given period of time or longer.

5. A radar device according to claim 1, wherein the transmitting means is operative to transmit a FMCW pulse during a first mode, and wherein the unmodulated pulse transmitting means and dirt detecting means are operative during a dirt detection mode that is separate from said first mode.

6. A radar device, comprising:

transmitting means for transmitting an electric wave as a transmission signal from a common antenna, a direction of transmission for said transmission signal by said antenna being one or more of a plurality of predetermined transmission directions in a period of time defining a predetermined measurement cycle;

receiving means for receiving a reflected wave resulting from reflecting the transmission signal from an object as a reception signal;

detecting means which mixes the transmission signal and the reception signal together to generate a beat signal for detecting the object therefrom;

measuring means for measuring a distance to the object and a relative speed of the object on the basis of the beat signal;

unmodulated pulse transmitting means for modifying an unmodulated wave into a pulse and transmitting the pulse from said common antenna in one of said plurality of predetermined transmission directions;

A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means, wherein the transmitting means selectively transmits the transmission signal in said predetermined transmission directions of an electric wave beam at a respective predetermined timings during each of a plurality of predetermined measurement cycles, and wherein the unmodulated pulse transmitting means selectively transmits an unmodulated pulse in at least one beam direction during each of said predetermined measurement cycles.

7. A radar device, comprising:

transmitting means for transmitting a frequency modulated wave as a transmission signal from a common antenna, a direction of transmission for said transmission signal by said antenna being one of a plurality of predetermined transmission directions;

receiving means for receiving a reflected wave resulting from reflecting the transmission signal from an object as a reception signal;

detecting means which mixes the transmission signal and the reception signal together to generate a beat signal for detecting the object therefrom;

measuring means for measuring a distance to the object and a relative speed of the object on the basis of the beat signal;

unmodulated pulse transmitting means for modifying an unmodulated wave into a pulse and transmitting the pulse from said common antenna in one of said plurality of predetermined transmission directions;

A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means, wherein the transmitting means selectively transmits the transmission signal in each of said predetermined transmission directions of an electric wave beam at a respective predetermined timing, and wherein the unmodulated pulse transmitting means selectively transmits the unmodulated pulse in a given one or more of said plurality of predetermined transmission directions at a specific timing based on a current direction of a transmission signal from said transmitting means.

8. A radar device according to claim 7, wherein the transmitting means is operative to transmit a FMCW pulse during a first mode, and wherein the unmodulated pulse transmitting means and dirt detecting means are operative during a dirt detection mode that is separate from said first mode.

9. A radar device, comprising:

transmitting means for transmitting a frequency modulated wave as a transmission signal from a common antenna, a direction of transmission for said transmission signal by said antenna being one or more of a plurality of predetermined transmission directions in a period of time defining a predetermined measurement cycle;

receiving means for receiving a reflected wave resulting from reflecting the transmission signal from an object as a reception signal;

detecting means which mixes the transmission signal and the reception signal together to generate a beat signal for detecting the object therefrom;

measuring means for measuring a distance to the object and a relative speed of the object on the basis of the beat signal;

unmodulated pulse transmitting means for modifying an unmodulated wave into a pulse and transmitting the pulse from said common antenna in one of said plurality of predetermined transmission directions;

A/D converting means for converting the beat signal generated by the detecting means into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means, wherein the transmitting means selectively transmits the transmission signal in said predetermined transmission directions of an electric wave beam at a respective predetermined timings during each of a plurality of predetermined measurement cycles, and wherein the unmodulated pulse transmitting means selectively transmits an unmodulated pulse in at least one beam direction during each of said predetermined measurement cycles.

10. A radar device, comprising:

transmitting means for modulating a frequency modulated wave into a pulse and transmitting the pulse as a transmission signal from a common antenna, a direction of transmission for said transmission signal by said antenna being one of a plurality of predetermined transmission directions;

receiving means for receiving a reflected wave resulting from reflecting the transmission signal from an object as a reception signal in each of given distance gates;

detecting means which mixes the transmission signal and the reception signal together to generate a beat signal for detecting the object therefrom in each of the distance gates;

measuring means for measuring a distance to the object and a relative speed of the object on the basis of the beat signal generated by the detecting means;

unmodulated pulse transmitting means for modifying an unmodulated wave into a pulse and transmitting the pulse from said common antenna in one of said plurality of predetermined transmission directions;

A/D converting means for converting the beat signal at a distance gate corresponding to a shortest distance among the beat signals into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means wherein the transmitting means selectively transmits the transmission signal in each of said predetermined transmission directions of an electric wave beam at a respective predetermined timing, and wherein the unmodulated pulse transmitting means selectively transmits the unmodulated pulse in a given one or more of said plurality of predetermined transmission directions at a specific timing based on a current direction of a transmission signal from said transmitting means.

11. A radar device according to claim 10, wherein the transmitting means is operative to transmit a FMCW pulse during a first mode, and wherein the unmodulated pulse transmitting means and dirt detecting means are operative during a dirt detection mode that is separate from said first mode.

12. A radar device, comprising:

transmitting means for modulating a frequency modulated wave into a pulse and transmitting the pulse as a transmission signal from a common antenna, a direction of transmission for said transmission signal by said antenna being one or more of a plurality of predetermined transmission directions in a period of time defining a predetermined measurement cycle;

receiving means for receiving a reflected wave resulting from reflecting the transmission signal from an object as a reception signal in each of given distance gates;

detecting means which mixes the transmission signal and the reception signal together to generate a beat signal for detecting the object therefrom in each of the distance gates;

measuring means for measuring a distance to the object and a relative speed of the object on the basis of the beat signal generated by the detecting means;

unmodulated pulse transmitting means for modifying an unmodulated wave into a pulse and transmitting the pulse from said common antenna in one of said plurality of predetermined transmission directions;

A/D converting means for converting the beat signal at a distance gate corresponding to a shortest distance among the beat signals into a digital voltage value when an unmodulated pulse is transmitted from the unmodulated pulse transmitting means at the specific timing, and the reflected wave is received by the receiving means; and dirt detecting means for detecting dirt adhered to a radome of an antenna on the basis of an output of the A/D converting means, wherein the transmitting means selectively transmits the transmission signal in said predetermined transmission directions of an electric wave beam at a respective predetermined timings during each of a plurality of predetermined measurement cycles, and wherein the unmodulated pulse transmitting means selectively transmits an unmodulated pulse in at least one beam direction during each of said predetermined measurement cycles.

13. A radar device, comprising:

transmitting means for generating a frequency modulated wave and an unmodulated wave as pulses and transmitting the pulses as transmission signals from a common antenna, a direction of transmission for said transmission signals by said antenna being one of a plurality of predetermined transmission directions;

receiving means for receiving a reflected wave resulting from reflecting the transmission signal from an object as a reception signal in each of given distance gates;

detecting means which mixes the transmission signal and the reception signal together to generate a beat signal for detecting the object therefrom in each of the distance gates;

measuring means for measuring a distance to the object and a relative speed of the object on the basis of the beat signal;

A/D converting means for converting the beat signal at a distance gate corresponding to a shortest distance among the beat signals into a digital voltage value when an unmodulated signal is modified into a pulse and transmitted by the transmitting means from said common antenna; and dirt detecting means for detecting dirt adhered to a radome of an antenna on the basis of an output of the A/D converting means, wherein the transmitting means selectively transmits the transmission signal as pulses of a frequency modulated wave in each of said predetermined transmission directions of an electric wave beam at a respective predetermined timing, and wherein the transmitting means selectively transmits the transmission signal as unmodulated pulses in a given one or more of said plurality of predetermined transmission directions at a specific timing based on a current direction of a transmission signal from said transmitting means.

14. A radar device, comprising:

transmitting means for generating a frequency modulated wave and an unmodulated wave as pulses and transmitting the pulses as transmission signals from a common antenna, a direction of transmission for said transmission signal by said antenna being one or more of a plurality of predetermined transmission directions in a period of time defining a predetermined measurement cycle;

receiving means for receiving a reflected wave resulting from reflecting the transmission signal from an object as a reception signal in each of given distance gates;

detecting means which mixes the transmission signal and the reception signal together to generate a beat signal for detecting the object therefrom in each of the distance gates;

measuring means for measuring a distance to the object and a relative speed of the object on the basis of the beat signal;

A/D converting means for converting the beat signal at a distance gate corresponding to a shortest distance among the beat signals into a digital voltage value when an unmodulated signal is modified into a pulse and transmitted by the transmitting means from said common antenna; and dirt detecting means for detecting dirt adhered to a radome of an antenna on the basis of an output of the A/D converting means, wherein the transmitting means selectively transmits the transmission signal as pulses of a frequency modulated wave in said predetermined transmission directions of an electric wave beam at a respective predetermined timing, and wherein the transmitting means selectively transmits an unmodulated pulse in at least one beam direction during each of said predetermined measurement cycles.

* * * * *